July 2, 1963
T. B. FRAME ETAL
3,096,124
WHEEL COVER
Filed July 27, 1960
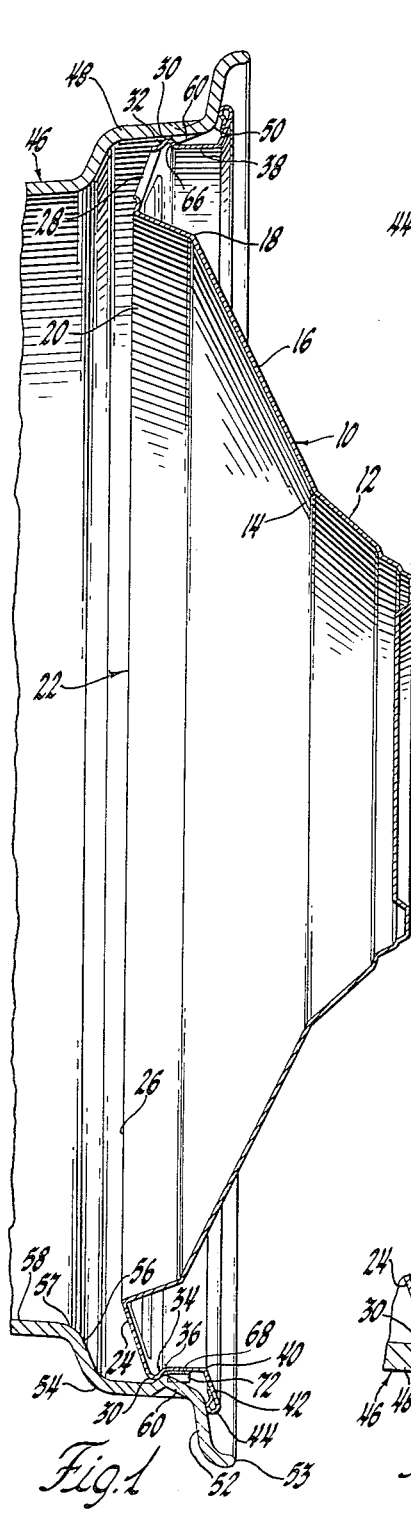
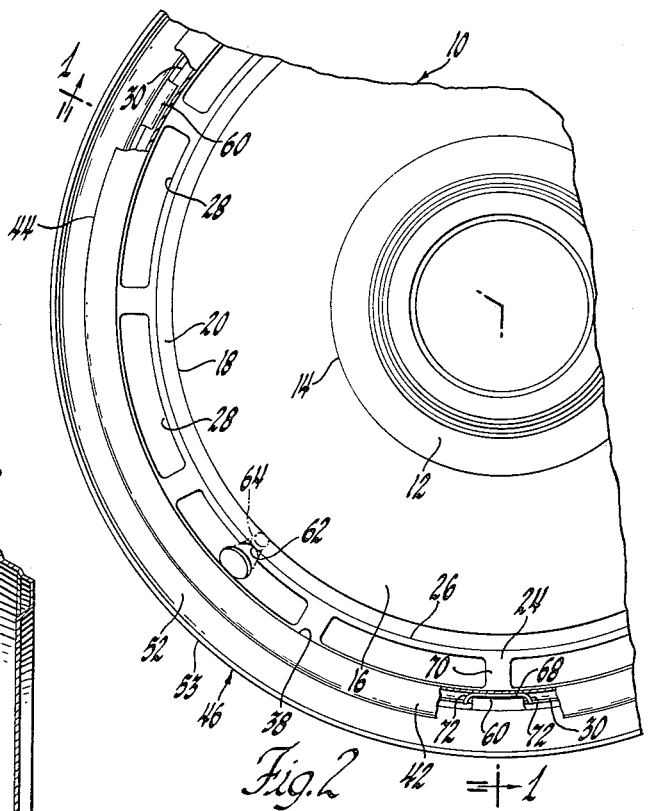
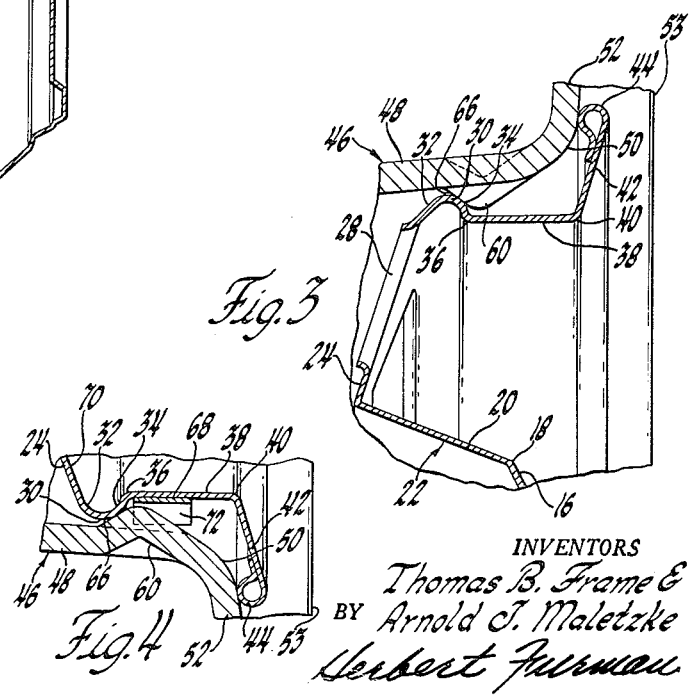
INVENTORS
Thomas B. Frame &
BY Arnold J. Maletzke
Herbert Furman
ATTORNEY

United States Patent Office 3,096,124
Patented July 2, 1963

3,096,124
WHEEL COVER
Thomas B. Frame, Syracuse, and Arnold J. Maletzke, Fayetteville, N.Y., assignors to General Motors Corporation, Detroit, Mich., a corporation of Delaware
Filed July 27, 1960, Ser. No. 45,743
2 Claims. (Cl. 301—37)

This invention relates to wheel covers, and more particularly the wheel covers of the self-retaining type.

The wheel cover of this invention includes new and improved self retaining means cooperable with a portion of a vehicle wheel to securely mount the cover thereon and yet allow for removal and reuse of the cover whenever required.

Generally, the cover includes a pair of angularly related annular wall portions, one of which extends generally axially and faces radially, and the other of which extends generally radially and faces axially, with the juncture between these wall portions comprising a continuous annular radially outwardly extending retention bead. The axially inner leg or wall of the bead is coplanar with and formed as a continuation of the radially extending and axially facing wall portion, and the axially outer leg or wall of the bead is provided by a juncture rib which connects this leg with the axially extending and radially facing wall portion. The retention bead is adapted to be snapped over and behind spaced bumps or protuberances on a portion of a vehicle wheel in order to mount the cover on the wheel. Since the retention bead is distorted out of its normal, generally circular shape when the cover is mounted on the wheel, the axially inner leg of the bead is under considerable radial stress. By making this inner leg coplanar with and a continuation of a radially extending annular wall portion, the radial stress is distributed over this wall portion so that the wall portion backs up and rigidifies the retention bead and passes the radial stresses to the center portion of the cover. Further, the protuberances on the wheel rim include angularly related axially inner and outer radially extending cam surface portions, with the axially inner surface portion being engageable by the retention bead and being located generally normal to the radially extending annular wall portion to further ensure that the radial stresses are distributed over this wall portion.

The primary object of this invention is to provide a new and improved wheel cover of the self-retaining type. Another object of this invention is to provide a new and improved wheel cover of the self-retaining type which includes a continuous annular retention bead adapted to be retainingly cooperable with protuberance means on a vehicle wheel, with the retention bead being located with respect to the cover so as to distribute radial stresses applied thereto over an annular generally radially extending cover wall portion.

These and other objects of the invention will be readily apparent from the following specification and drawings wherein:

FIGURE 1 is a sectional view of a wheel cover according to this invention taken generally along the plane indicated by line 1—1 of FIGURE 2;

FIGURE 2 is a partially broken away partial front elevational view of the cover;

FIGURE 3 is an enlarged view of a portion of FIGURE 1; and

FIGURE 4 is an enlarged view of a portion of FIGURE 1.

Referring now particularly to FIGURES 1 and 2 of the drawings, a cover 10 includes a central annular crown portion 12 which merges on an annular juncture rib 14 with a radially extending and axially facing annular cover wall portion 16. Wall portion 16 merges on an annular juncture rib 18 with a generally radially and axially outwardly extending annular wall portion 20 which forms the radially inner wall of a generally channel shaped inwardly dished cover portion 22. The base wall of cover portion 22 is provided by a generally radially and axially outwardly extending annular wall portion 24 which is joined to wall portion 20 by an annular juncture rib 26. Wall portion 24 is provided with a plurality of circumferentially spaced axially inwardly flanged openings 28 which provide air circulation through the cover for brake cooling purposes. The openings 28 weaken the cover 10 in certain respects, but any such weakening is minimized and substantially overcome in the subject cover by the arrangement of the annular retention bead 30 with respect to the wall portion 24. As shown in FIGURE 3, the axially inner, generally radially and axially outwardly extending leg or wall 32 of bead 30 is formed coplanar with or as a continuation of the wall portion 24. The axially outer leg or wall 34 of bead 30 merges on an annular juncture rib 36 with a radially facing generally axially outwardly extending annular wall portion 38 which forms the radially outer wall of the cover portion 22. Wall portion 38 merges on an annular juncture rib 40 with an annular radially extending and axially outwardly facing cover wall portion 42 which terminates in a generally closed bead structure 44.

It is intended that the cover of this invention is to be mounted on a vehicle wheel having a plurality of spaced bumps or protuberances which are cooperable with the retention bead 30 in order to retainingly and yet releasably mount the cover on the wheel. As shown in FIGURE 1, the wheel rim of a vehicle wheel 46 of known type includes an annular generally axially outwardly extending and radially facing intermediate flange portion 48 which merges on an annular juncture rib 50 at its axially outer end with a radially outwardly extending and axially outwardly facing annular terminal flange portion 52 having a terminal lip portion 53. The axially inner end portion of flange portion 48 merges on an annular juncture rib 54 with a radially and axially outwardly extending flange portion 56 which in turn merges on an annular juncture rib 57 with the base flange 58 of the wheel rim which is secured to the wheel body or spider. The intermediate flange portion 48 is provided with a plurality of circumferentially spaced bumps or protuberances 60, at least three such protuberances being desirable, although more may be provided, if desired.

When the cover 10 is mounted on the wheel, the valve stem notch 62 of the cover is first located with respect to the valve stem 64 and the cover is thereafter pushed axially inwardly until the retention bead 30 snaps over and behind the protuberances 60, with the bead 30 riding on the axially inner generally radially and axially outwardly extending cam surface 66 of each of the protuberances and being located thereon by engagement of the bead structure 44 of the cover with the flange portion 52 of the wheel rim. In order for the bead 34 to be snapped over and behind the protuberances 60, the bead must first be distorted out of its normal generally circular shape, and this distortion remains after the retention bead has been snapped over and behind the protuberances. Thus, the axially inner leg or wall 32 of the bead is placed under considerable radial stress. However, since the leg 32 is coplanar with and formed as a continuation of the wall portion 24, this radial stress is distributed over the entire wall portion 24 rather than about any bending axis located intermediate the wall portion 24 and the retention bead 30. Further, it will be remembered that the flanged air circulation openings 28 weaken the wall portion 24. However, since the radial stresses are applied generally in the plane of the wall portion 24, any weakening of this wall portion by the openings 28 is minimized and substantially overcome so that it is minor and relatively unimportant. Thus, the outer peripheral marginal structure of the cover, including the wall portions 20, 38, and 42, as well as the retention bead 30 tends to bend in axial directions about axes located at juncture rib 18. Also, the wall portion 24 is located generally normal to the cam surface 66 to further ensure that the radial stresses will be distributed over wall portion 24. Thus, the outer peripheral marginal structure of the cover is rigidified by the arrangement of the bead 30 with respect to the wall portion 24 so that the cover will be self-retained on the wheel despite any and all road or other stresses applied to the wheel which tend to distort the wheel out of its normal circular shape and which apply various generally radially directed stresses to the cover 10.

In order to circumferentially locate the cover 10 with respect to the wheel, but allow a limited degree of rotational movement therebetween, the cover 10 is provided with anti-rotation means adapted to cooperate with one of the protuberances 60. As best shown in FIGURE 4 of the drawings, a generally U-shaped clip type member 68 has its base welded to the wall portion 38 generally radially opposite one of the radial ribs 70 intermediate the flanged openings 28, with the axially inner side edge of the member 68 bearing against the rib 36 approximately at the line of tangency between the rib 36 and wall portion 38. The circumferentially spaced radially outwardly extending legs 72 of member 64 are located in opposing spaced relationship to the sides of one of the protuberances 60 so as to allow limited relative rotational movement between the cover 10 and the wheel in either direction.

Thus, this invention provides a new and improved vehicle wheel cover of the self-retaining type.

We claim:

1. In combination with a wheel structure including generally axially extending flange structure provided with a plurality of generally radially extending spaced protuberances, a vehicle wheel cover comprising, a cover structure including a generally axially extending annular first wall portion telescoped within said flange structure, a generally axially facing and axially and radially outwardly extending annular second wall portion located angularly to said first wall portion, an annular retention bead structure interconnecting said first and second wall portions and engageable with said protuberances to place said bead structure under radial stress, said bead structure including an axially inner leg located generally coplanar with said second wall portion to distribute said radial stress over said second wall portion upon engagement of said retention bead structure with said protuberances, and axially extending flange structure located in generally radially inwardly spaced juxtaposed relationship to said first wall portion and connecting said second wall portion and a central generally dome-shaped portion of said cover across axially spaced sharply defined annular juncture ribs located generally oppositely and radially inwardly of said bead structure and within the confines of said axially extending wheel flange structure, at least one of said juncture ribs providing a bending axis for said first and second wall portions and said bead structure relative to said central portion of said cover to permit distortion of said bead structure upon assembly and removal of said wheel cover relative to said wheel structure.

2. In combination with a wheel structure including generally axially extending flange structure provided with a plurality of generally radially extending circumferentially spaced protuberances, each of which includes a generally axially facing cam surface, a vehicle wheel cover comprising, a cover structure including a generally axially extending annular first wall portion telescoped within said flange structure, a generally axially facing and radially extending annular second wall portion located angularly to said first wall portion, an annular retention bead structure interconnecting said first and second wall portions and engageable with said cam surfaces to place said bead structure under radial stress, said bead structure including an axially inner leg located generally coplanar with said second wall portion to distribute said radial stress over said second wall portion upon engagement of said retention bead structure with said protuberances, said cam surfaces and said second wall portion being located generally normal to each other, and axially extending flange structure located in generally radially inwardly spaced juxtaposed relationship to said first wall portion and connecting said second wall portion and a central generally dome-shaped portion of said cover across axially spaced sharply defined annular juncture ribs located generally oppositely and radially inwardly of said bead structure and within the confines of said axially extending wheel flange structure, at least one of said juncture ribs providing a bending axis for said first and second wall portions and said bead structure relative to said central portion of said cover to permit distortion of said bead structure upon assembly and removal of said wheel cover relative to said wheel structure.

References Cited in the file of this patent
UNITED STATES PATENTS

| | | |
|---|---|---|
| 2,308,617 | Lyon | Jan. 19, 1943 |
| 2,631,066 | Horn | Mar. 10, 1953 |
| 2,865,680 | Lyon | Dec. 23, 1958 |
| 2,867,477 | Lyon | Jan. 6, 1959 |
| 2,995,403 | Lyon | Aug. 8, 1961 |
| 2,996,337 | Hurd | Aug. 15, 1961 |

FOREIGN PATENTS

| | | |
|---|---|---|
| 529,974 | Canada | Sept. 4, 1956 |